United States Patent [19]

Paynter

[11] Patent Number: 4,516,441

[45] Date of Patent: May 14, 1985

[54] FLEXIBLE REMOTE CONTROL WITH IMPROVED ANCHORING OF OUTER BALL RACES

[75] Inventor: Alan H. Paynter, Brookfield, Conn.

[73] Assignee: Incom International Inc., Pittsburgh, Pa.

[21] Appl. No.: 455,239

[22] Filed: Jan. 3, 1983

[51] Int. Cl.³ .............................................. F16C 1/10
[52] U.S. Cl. .................................................. 74/501 R
[58] Field of Search .............. 74/501 R, 501.5 R, 505; 114/144 R, 154, 160, 161; 251/248, 249.5, 293, 294; 403/3, 4, 310, 313

[56] References Cited

U.S. PATENT DOCUMENTS

| | | | |
|---|---|---|---|
| 3,552,218 | 1/1971 | Gregory | 74/501 R |
| 4,133,222 | 1/1979 | Dooley | 74/501.5 H |
| 4,188,835 | 2/1980 | Ion | 74/501 R |

FOREIGN PATENT DOCUMENTS

| | | | |
|---|---|---|---|
| 1142416 | 3/1983 | Canada | 74/501 R |
| 863767 | 3/1961 | United Kingdom | 74/501 R |

*Primary Examiner*—Kenneth J. Dorner
*Assistant Examiner*—Vinh Luong
*Attorney, Agent, or Firm*—Paul W. Garbo

[57] ABSTRACT

In each end fitting of a flexible remote control, improved anchoring of the outer ball races is achieved by attaching the end of one race to a fixed anchor which is at least partially cylindrical so that it can rotate in the fitting and by attaching the end of the other race to a slidable anchor which is in sliding contact with the race attached to the fixed anchor. The push-pull blade of the control passes through a slot in each of both anchors which help prevent bowing of the blade when subjected to a heavy push load.

12 Claims, 7 Drawing Figures

U.S. Patent May 14, 1985 4,516,441
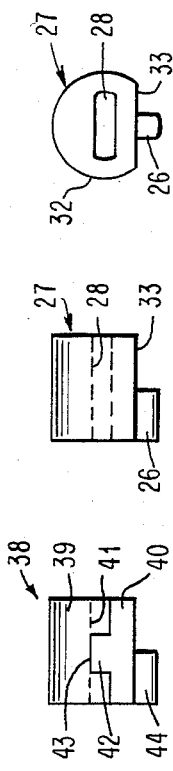
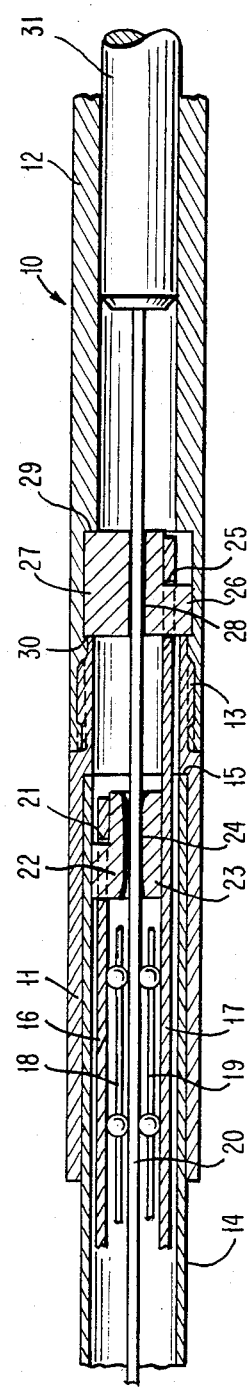
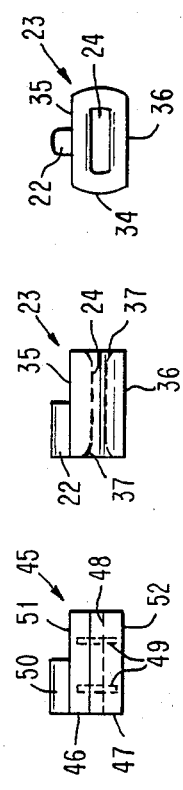

FLEXIBLE REMOTE CONTROL WITH IMPROVED ANCHORING OF OUTER BALL RACES

BACKGROUND OF THE INVENTION

This invention relates to tubular flexible remote controls having a push-pull element movable on balls which are disposed on opposite sides of the push-pull element and in the grooves of outer races. More particularly, the invention involves improved means for anchoring the ends of the outer races.

Illustrative of such a flexible remote control is that disclosed in U.S. Pat. No. 3,128,637 to Richoux whose anchoring member 16 for the outer rails or races is composed of two half-shells 17 and 18. Shell 17 holds the end of one race 11 without any play, while shell 18 holds the end of the other race 11 with a play equal to the length of its cut-out part 21. Referring to FIG. 1 of Richoux, the flexible control can be bent upwardly but not downwardly because there is no play in the anchoring of race 11 by shell 17.

U.S. Pat. No. 3,287,990 to Ellinger shows the anchoring of the ends of outer races 21 by pins or followers 31 which cooperate with slots in a pair of coaxial cylindrical tubes 26, 27. The Ellinger anchor permits bending of the flexible control with either of races 21 on the outer curvature. Besides adding to the cost of the remote control, the coaxial tubes 26, 27 increase the diameter of the end fitting which is undesirable in some installations.

U.S. Pat. No. 3,580,103 to Shreve captures the bent doglike portion 64 of race 62 in the annular cavity 42 of his end fitting. The end 68 of Shreve's other race 66 is provided with shoe member 74 which is axially slidable along band member 30. Even though race 62 has no lengthwise play, the Shreve control can be bent with race 62 on either the inner or outer curvature. However, when fixed race 62 is on the inner curvature of a large bend, say 180° to 210°, in the flexible control, a heavy push load on band 30 may cause band 30 to curve outwardly in the space between shoe 74 and bushing 44 with the result that one or more balls may be dislodged from the end of retainer assembly 76. The dislodgment of any balls from a retainer assembly can lead to malfunction or even jamming of the control. Moreover, doglike portion 64 of race 62 is an awkward and undesirable way of anchoring race 62.

Accordingly, the object of this invention is to provide simplified and improved anchors for the outer races of a flexible remote control which permit bending of the control with either race on the outer curvature. Other features and advantages of the invention will be apparent from the description which follows.

SUMMARY OF THE INVENTION

In accordance with this invention, each end of one outer race of a flexible remote control is held by anchor means in a lengthwise fixed position within the end fitting of the control, while each of the other outer race is held by anchor means slidable along the length of the end fitting. Both the fixed and slidable anchors are slotted so that the push-pull blade of the control can move freely therethrough.

Each anchor, whether of the fixed or slidable type, may be made as a unit or as a mating pair of parts. The attachment of each anchor to the end of an outer race is simply accomplished by inserting a radial pin or lug on the periphery of the anchor into an aperture or slot in the end of the race. Each fixed anchor is held in a cylindrical recess within each end fitting of the remote control. The cylindrical recess has a length to capture the fixed anchor substantially without lengthwise play and a diameter to allow rotation of the fixed anchor.

Both types of anchors may be made of various metals and plastics. Stainless steel, bronze and brass are preferred metals. Nylon, thermo-set resins, fluorinated ethylene-propylene polymer, and polypropylene, with or without fillers or fibers, illustrate desirable plastics that can be used to form the anchors of this invention. The fixed anchors are the anchors subjected to the greatest mechanical forces. Hence, especially in heavy duty remote controls, the fixed anchors are preferably made of metal. Slidable anchors made of plastics offer the advantage of avoiding the scoring and gouging of the metal push-pull blade which is possible when the metal blade is repeatedly moved back and forth in contact with metal slidable anchors.

For a better understanding of the invention, the further description thereof will refer to the accompanying drawings.

BRIEF DESCRIPTION OF THE DRAWINGS

FIG. 1 is a longitudinal sectional view of the portion of an end fitting of a flexible remote control, which contains a preferred embodiment of the race anchors of this invention;

FIG. 2 is a side view of the fixed anchor shown in FIG. 1;

FIG. 3 is a right end view of the anchor shown in FIG. 2;

FIG. 4 is a side view of the slidable anchor shown in FIG. 1;

FIG. 5 is a right end view of the slidable anchor shown in FIG. 4;

FIG. 6 is a side view of a modified fixed anchor formed by a pair of mating parts; and FIG. 7 is a side view of a modified slidable anchor formed by a pair of mating parts.

DESCRIPTION OF PREFERRED EMBODIMENTS

The portion of end fitting 10 of a flexible remote control shown in FIG. 1 is formed by two rigid cylindrical tubes 11, 12 which are screwed together at their threaded ends 13. An end of flexible cylindrical tubing 14 of the remote control is held in cylindrical recess 15 of tube 11 by swaging. The depth of recess 15 is equal to the thickness of tubing 14 so that the inside diameters of tubing 14 and the unrecessed portion of tube 11 are the same.

The conventional components of the remote control comprise two outer ball races 16,17, two ball cage strips 18,19 and center push-pull blade 20. The end of ball race 16 has slot 21 into which lug 22 of slidable anchor 23 fits. Anchor 23 has slot 24 through which blade 20 passes. The end of ball race 17 has slot 25 into which lug 16 of longitudinally fixed anchor 27 fits. Fixed anchor 27 has slot 28 through which blade 20 passes. Anchor 27 is rotatably held in cylindrical recess 29 in tube 12. The length of recess 19, measured from male-threaded end 30 of tube 11, is such that anchor 27 is captured substantially without longitudinal play. The end of push-pull blade 20 is connected to cylindrical push-pull rod 31 which is slidable and rotatable in tube 12.

FIGS. 2 and 3 show that fixed anchor 26 has a cylindrical body 32 except for the segment that has been cut off to leave a flat side 33 from which lug 26 projects radially. Slot 28 in fixed anchor 27 is dimensioned to allow the stroking of push-pull blade 20 freely therethrough.

FIGS. 4 and 5 show that slidable anchor 23 has a cylindrical body 34 except that two segments have been cut off to leave a flat side 35 from which lug 22 projects radially and a parallel flat side 36 which is disposed in slidable contact with fixed outer race 17. Slot 24 in anchor 23 is dimensioned to allow free movement of blade 20 and anchor 23 relative to each other. Especially when slidable anchor 23 is made of metal, slot 24 is preferably slightly flared outwardly at both ends to ensure that these ends do not bind and score the faces of push-pull blade 20. Flared ends 37 of slot 24 are best seen in FIG. 4. The diameter of cylindrical body 34 is such that anchor 23 can slide and rotate in tubing 14 and tube 11, both of which have the same inside diameter.

FIG. 6 shows fixed anchor 38 which is identical to fixed anchor 27 of FIG. 2 except that is made of two mating parts 39,40 which provide slot 41 between them for the passage of push-pull blade 20 therethrough. Part 40 has a flat face for contact with one side of blade 20 and two lateral lugs 42 projecting from that flat face; lugs 42 are disposed diametrically opposite each other so that blade 20 can pass between them. Part 39 has two lateral cut-outs 43 into which lugs 42 of part 40 fit to lock mating parts 39,40 together. Part 40 has lug 44 which corresponds to lug 26 of fixed anchor 27 of FIG. 2.

FIG. 7 shows slidable anchor 45 which is identical to slidable anchor 23 of FIG. 4 except that it is made of two mating parts 46,47 which provide slot 48 between them for the passage of push-pull blade 20 therethrough. Part 46 has a flat face for contact with one side of blade 20 and a parallel face 51 from which lug 50 projects. Lug 50 corresponds to lug 22 of slidable anchor 23 of FIG. 4. Parts 46,47 are held together by two pairs of pins 49 set in holes in parts 46,47; one pair of pins 49 is positioned diametrically opposite the other pair in the portions of parts 46,47 which form the opposite edges of slot 48. Part 47 has a flat side 52 which corresponds to flat side 36 of slidable anchor 23 of FIG. 4.

It is noteworthy that both the slidable anchor and the fixed anchor of this invention give important support to the push-pull blade at spaced positions along its length where the blade is not supported by ball cage strips on its opposite faces. The support provided by the novel anchors helps to prevent bowing of the push-pull blade when it is subjected to heavy push loads.

Good engineering design dictates that the length of outer race 16 which is attached at each end to a slidable anchor 23 is such that when one anchor 23 abuts fixed anchor 27 in one end fitting 10 and the control is bent 210° with outer race 16 on the outer side of the curve, the other slidable anchor 23 will still be completely within tube 11 of the other end fitting 10. In other words, the end of slidable anchor 23 which faces ball cage strips 18,19 never moves outside the end of tube 11. On the other hand, the clearance between slidable anchor 23 and fixed anchor 27, when the other slidable anchor 23 abuts the other fixed anchor 27, is such that bending the control 210° with outer race 16 on the inner side of the curve will bring both slidable anchors 23 into substantially abutting relation with their respective fixed anchors 27. If the control is designed for a maximum bend of only 180°, then the length of outer race 16 and the clearance between slidable anchor 23 and fixed anchor 27 will be slightly less than the corresponding dimensions for the control designed to permit a maximum bend of 210°.

Good engineering design also dictates that the maximum length of both ball cage strips 18,19 is equal to the distance between the ends of slidable anchors 23 which face each other less one-half of the design maximum stroke of the control. For example, in a control designed for a maximum stroke of 8 inches, both ball cage strips 18,19 will be 4 inches shorter than the distance between the facing ends of slidable anchors 23.

Ball cage strips 18,19 may be of the conventional type in which the small steel balls are held in an aligned spaced relation by a metal strip having a series of apertures into each of which a ball fits. U.S. Pat. No. 3,667,313 to Young discloses that the metal strip may be replaced by a strip of flexible plastic such as tetrafluoroethylene polymer.

Those skilled in the art will visualize variations of the invention set forth hereinbefore without departing from its spirit and scope. For instance, slidable anchor 45 of FIG. 7 may omit pins 49 and having mating parts 46,47 locked together by lugs on one of these parts fitted into cut-outs in the other part in the manner shown in FIG. 6. Fixed anchor 38 may be formed by mating parts 39,40 without lugs 42 and cut-outs 43 or any other means for locking parts 39,40 together because cylindrical recess 29 in end fitting 10 will suffice to hold parts 39,40 together. While lugs 22 and 26 on anchors 23 and 27, respectively, provide simple and effective means for attaching the ends of outer races 16,17 thereto, other ways of making these attachments include screwing or welding the ends of the outer races to the anchors. Accordingly, only such limitations should be imposed on the scope of the invention as are set forth in the appended claims.

What is claimed is:

1. In a flexible remote control which has a push-pull blade movably supported in flexible cylindrical tubing by ball cage strips disposed between the opposite faces of said blade and two outer ball races, each end of said tubing being fastened to an end fitting formed by two rigid cylindrical tubes screwed together, the improvement within each said end fitting comprising a slidable anchor attached to an end of one of said races and having a side in slidable contact with the other of said races, said slidable anchor being slotted for the passage of said blade therethrough, and a fixed anchor attached to an end of the other of said races and slotted for the passage of said blade therethrough, at least part of said fixed anchor being cylindrical to permit rotation of said fixed anchor in a cylindrical recess formed between said two cylindrical tubes, and said fixed anchor being held in said recess substantially without longitudinal play.

2. The remote control of claim 1 wherein the slidable anchor is attached to an end of an outer ball race by a lug on said slidable anchor fitted into a slot in said end of said race.

3. The remote control of claim 1 wherein the fixed anchor is attached to an end of an outer ball race by a lug on said fixed anchor fitted into a slot in said end of said race.

4. The remote control of claim 1 wherein the slidable anchor is formed by a locked pair of mating parts.

5. The remote control of claim 1 wherein the fixed anchor is formed by a pair of mating parts.

6. The remote control of claim 1 wherein the slot in the slidable anchor is slightly flared outwardly at both ends.

7. The remote control of claim 1 wherein at least part of the slidable anchor is cylindrical to facilitate rotation of said slidable anchor in the end fitting.

8. The remote control of claim 1 wherein the length of the outer ball race attached at its two ends to the two slidable anchors is such that said control can be bent 210° and said two slidable anchors remain within their respective end fittings.

9. The remote control of claim 8 wherein each slidable anchor and each fixed anchor is attached to an end of an outer ball race by a lug on each of said anchors fitted into a slot in an end of an outer ball race.

10. The remote control of claim 9 wherein at least part of each slidable anchor is cylindrical to facilitate rotation of said slidable anchor in the end fittings.

11. The remote control of claim 8 wherein each slidable anchor is formed by a locked pair of mating parts and the slot in said slidable anchor is slightly flared outwardly at both ends.

12. The remote control of claim 11 wherein each fixed anchor is formed by a pair of mating parts.

* * * * *